(12) United States Patent
Isikman et al.

(10) Patent No.: US 10,139,250 B2
(45) Date of Patent: Nov. 27, 2018

(54) OPTICAL ENCODER BASED ON LIGHT-STEERING BASED CONTRAST GENERATION FROM A FIRST PLURALITY OF PRIMARY CONVEX MIRROR SECTIONS AND A SECOND PLURALITY OF SECONDARY MIRROR SECTIONS

(71) Applicant: Apple Inc., Cupertino, CA (US)

(72) Inventors: Serhan O. Isikman, Sunnyvale, CA (US); Anant Rai, San Jose, CA (US); Prashanth Holenarsipur, Fremont, CA (US); Richard Ruh, Monte Sereno, CA (US); Takahiro Atsuta, Hyogo (JP); Akio Yamakawa, Hyogo (JP); Yoshimitsu Ohara, Hyogo (JP)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 15/206,068

(22) Filed: Jul. 8, 2016

(65) Prior Publication Data

US 2018/0010930 A1    Jan. 11, 2018

(51) Int. Cl.
*G01D 5/347*    (2006.01)
*G01D 5/30*    (2006.01)
*G01D 5/28*    (2006.01)

(52) U.S. Cl.
CPC ............... *G01D 5/30* (2013.01); *G01D 5/285* (2013.01); *G01D 5/3473* (2013.01)

(58) Field of Classification Search
CPC ............ G01D 5/34715; G01D 5/3473; G01D 5/2457; G01D 5/347; G01D 5/00; G01D 5/341

(Continued)

(56) References Cited

U.S. PATENT DOCUMENTS 4,634,861 A  *  1/1987  Ching ................ G01D 5/34792
                                              250/229
5,483,261 A       1/1996  Yasutake
                      (Continued)

FOREIGN PATENT DOCUMENTS

JP       2000-163031 A      6/2000
JP       2002-342033 A     11/2002
WO   WO 2015147756 A1  *  10/2015  ............. G01D 5/342

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Que T Le
(74) *Attorney, Agent, or Firm* — Morrison & Foerster, LLP

(57) ABSTRACT

In some examples, an optical encoder may consist of a light source that shines light onto a wheel which then reflects the light onto a sensor. Using information encoded in the reflected light, the rotation of the wheel may be determined. In some examples, rotation of the wheel may be determined by detecting an encoding pattern in light reflected from an exterior surface of the wheel. In some examples, the encoding pattern can be a pattern of light and dark stripes. In some examples, a pattern of light stripes can be generated from light reflecting off of reflective portions of the wheel. Some examples of the disclosure relate to using a surface topology for a wheel that can be used to generate an encoding pattern of light and dark stripes in light reflected from the surface of the wheel, even when the surface of the wheel is uniformly reflective.

22 Claims, 7 Drawing Sheets

(58) Field of Classification Search
USPC .............................. 250/231.13, 231.18, 239
See application file for complete search history.

(56) References Cited

U.S. PATENT DOCUMENTS

| | | | |
|---|---|---|---|
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,222,182 B1 | 4/2001 | Featherston et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,598,509 B2 | 12/2013 | Batchelder |
| 8,759,746 B2 | 6/2014 | Sun |
| 2006/0197753 A1 | 9/2006 | Hotelling |
| 2014/0326863 A1 | 11/2014 | Choi et al. |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

OPTICAL ENCODER BASED ON LIGHT-STEERING BASED CONTRAST GENERATION FROM A FIRST PLURALITY OF PRIMARY CONVEX MIRROR SECTIONS AND A SECOND PLURALITY OF SECONDARY MIRROR SECTIONS

FIELD OF THE DISCLOSURE

This relates generally to user inputs, such as mechanical inputs, and more particularly, to providing optical encoders having encoding patterns for detecting rotational movement of mechanical inputs.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In addition to touch panels/touch screens, many electronic devices may also have mechanical inputs (or mechanical input mechanisms), such as buttons, switches, and/or knobs. These mechanical inputs can control power (i.e., on/off) and volume for the electronic devices, among other functions. Some devices may utilize various types of encoders for obtaining and collecting input data for the device. For example, an optical encoder may consist of a light source that shines light onto a wheel which then reflects the light onto a sensor. The optical encoder can be used to detect rotation of the wheel may be determined and interpret the rotation as a mechanical input to the device.

SUMMARY OF THE DISCLOSURE

The present disclosure relates to rotatable optical encoders for enabling detection of rotation of a mechanical input, such as knob or wheel. In some examples, an optical encoder may consist of a light source that shines light onto a wheel which then reflects the light onto a sensor. Using information encoded in the reflected light, the rotation of the wheel may be determined. In some examples, rotation of the wheel may be determined by detecting an encoding pattern in light reflected from an exterior surface of the wheel. In some examples, the encoding pattern can be a pattern of light and dark stripes. In some examples, a pattern of light stripes can be generated from light reflecting off of reflective portions (e.g., shiny portions) of the wheel. In some examples, a pattern of the dark stripes can be generated from light reflecting off of non-reflective portions of the wheel that can absorb and/or scatter incident light (e.g., darkened and/or etched and/or rough portions of the wheel). By utilizing absorption and scattering of the light, some portions of the light incident on the wheel can be wasted, i.e., never received by the sensor. Some examples of the disclosure relate to using a surface topology for a wheel that can be used to generate an encoding pattern of light and dark stripes in light reflected from the surface of the wheel, even when the surface of the wheel is uniformly reflective. In some examples, the surface pattern can be comprised of convex mirror portions, concave mirror portions, or combinations thereof. In some examples, the surface pattern can be comprised of flat mirror portions that can have angles for redirecting portions of the light incident in different directions to form the dark stripes and instead divert the light to the light stripes, rather than utilizing absorption and/or scattering.

DETAILED DESCRIPTION

Figure 1:
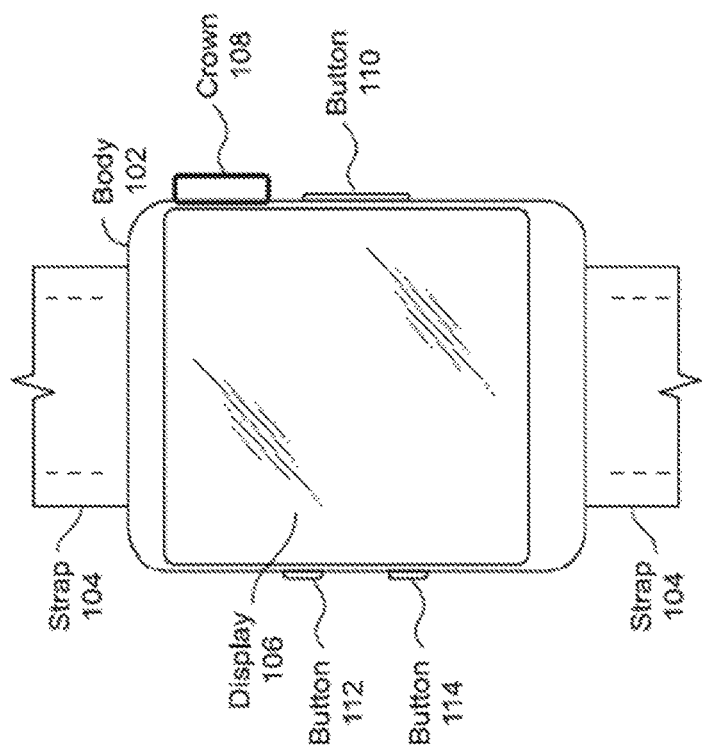
FIG. 1 illustrates an exemplary personal device according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In addition to touch panels/touch screens, many electronic devices may also have mechanical inputs (or mechanical input mechanisms), such as buttons, switches, and/or knobs. These mechanical inputs can control power (i.e., on/off) and volume for the electronic devices, among other functions. Some devices may utilize various types of encoders for obtaining and collecting input data for the device. For example, an optical encoder may consist of a light source that shines light onto a wheel which then reflects the light onto a sensor. The optical encoder can be used to detect rotation of the wheel may be determined and interpret the rotation as a mechanical input to the device.

The present disclosure relates to rotatable optical encoders for enabling detection of rotation of a mechanical input, such as knob or wheel. In some examples, an optical encoder may consist of a light source that shines light onto a wheel which then reflects the light onto a sensor. Using information encoded in the reflected light, the rotation of the wheel may be determined. In some examples, rotation of the wheel may be determined by detecting an encoding pattern in light reflected from an exterior surface of the wheel. In some examples, the encoding pattern can be a pattern of light and dark stripes. In some examples, a pattern of light stripes can be generated from light reflecting off of reflective portions (e.g., shiny portions) of the wheel. In some examples, a pattern of the dark stripes can be generated from light reflecting off of non-reflective portions of the wheel that can absorb and/or scatter incident light (e.g., darkened and/or etched and/or rough portions of the wheel). By utilizing absorption and scattering of the light, some portions of the light incident on the wheel can be wasted, i.e., never received by the sensor. Some examples of the disclosure relate to using a surface topology for a wheel that can be used to generate an encoding pattern of light and dark stripes in light reflected from the surface of the wheel, even when the surface of the wheel is uniformly reflective. In some examples, the surface pattern can be comprised of convex mirror portions, concave mirror portions, or combinations thereof. In some examples, the surface pattern can be comprised of flat mirror portions that can have angles for redirecting portions of the light incident in different directions to form the dark stripes and instead divert the light to the light stripes, rather than utilizing absorption and/or scattering.

FIG. 1 illustrates exemplary personal electronic device 100 according to examples of the disclosure. In the illustrated example, device 100 can be a watch that generally includes body 102 and strap 104 for affixing device 100 to the wrist of a user. That is, device 100 can be wearable. Body 102 can be designed to couple with straps 104. Device 100 can have touch-sensitive display screen (hereafter touchscreen) 106 and crown 108. Device 100 can also have buttons 110, 112, and 114. Though device 100 is illustrated as being a watch, it is understood that the examples of the disclosure can be implemented in devices other than watches, such as tablet computers, mobile phones, or any other wearable or non-wearable electronic device.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 108 can be mechanical, meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be configured to tilt in one or more directions or slide along a track at least partially around a perimeter of body 102. In some examples, more than one crown 108 can be included in device 100. The visual appearance of crown 108 can, but need not, resemble crowns of conventional watches. Buttons 110, 112, and 114, if included, can each be physical, touch-sensitive or both physical and touch sensitive. That is, the buttons may be, for example, physical buttons, capacitive buttons, or physical and capacitive buttons. Further, body 102, which can include a bezel, may have predetermined regions on the bezel that act as buttons. Furthermore, the bezel may act as a rotatable mechanical input, similar to crown 108.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual capacitance touch sensing, self-capacitance touch sensing, resistive touch sensing, projection scan touch sensing, or the like. Touch sensing can be achieved by sensing a capacitance formed between a touch sensor electrode and an object, e.g., a user's finger or hand, proximate thereto. The electrodes can be coupled to conductive traces, where one set of conductive traces can form drive lines to drive the electrodes with drive signals from drive circuitry and another set of conductive traces can form sense lines to transmit touch or sense signals, indicative of a touch proximate to the display 106, from the electrodes to sense circuitry. One type of touch panel for display 106 can have a row-column electrode pattern. Another type of touch panel for display 106 can have a pixelated electrode pattern. Display 106 can allow a user to perform various functions by touching or hovering near the touch sensor panel using one or more fingers or other objects.

In some examples, device 100 can further include one or more pressure sensors (not shown) for detecting an amount of force or pressure applied to the display 106. The amount of force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106.

The one or more pressure sensors can further be used to determine a position of the force that is being applied to display 106.

In some examples, device 100 can display a user interface on display 106. In some examples, when crown 108 is rotated downward while the user interface is displayed on display 106 of device 100, a portion of a window (not shown) or any other user interface element can emerge from, for example, the top of the display. In some examples, an increasing portion of the window can emerge from the top of the display as crown 108 continues to be rotated downward by finger 120.

Figure 2:
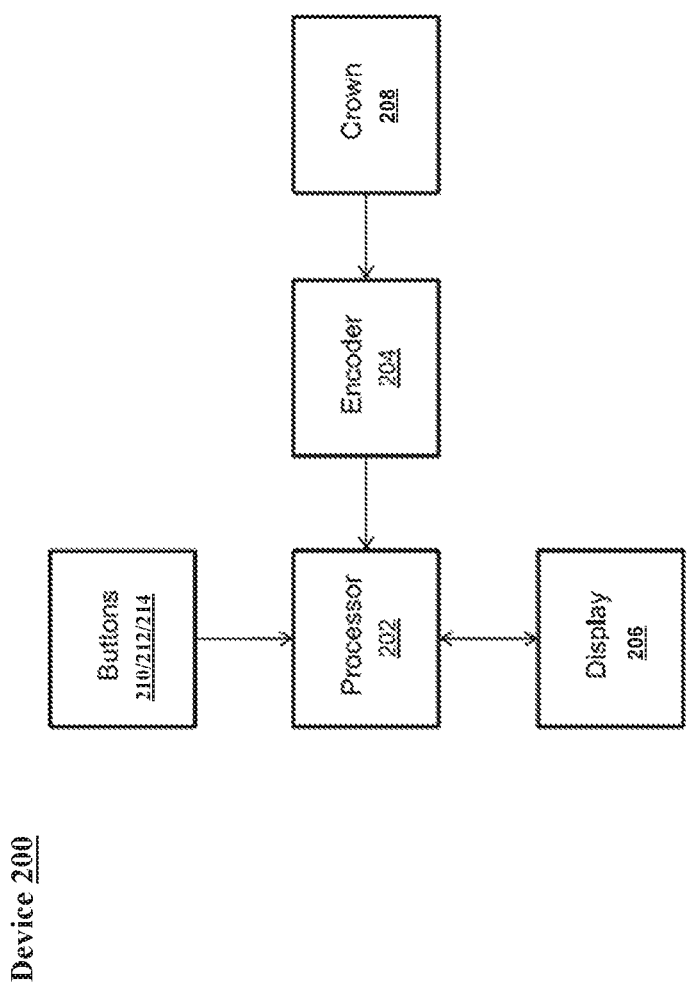
FIG. 2 illustrates a block diagram of components within an exemplary device according to examples of the disclosure.

FIG. 2 illustrates an exemplary block diagram of components within an exemplary device 200 according to examples of the disclosure. In some examples, crown 208 (which can correspond to crown 108 described above) can be coupled to encoder 204, which can be configured to monitor a physical state or change of physical state of the crown (e.g., the position and/or rotational state of the crown), convert it to an electrical signal (e.g., convert it to an analog or digital signal representation of the position or change in position of the crown), and provide the signal to processor 202. For instance, in some examples, encoder 204 can be configured to sense the absolute rotational position (e.g., an angle between 0-360°) of crown 208 and output an analog or digital representation of this position to processor 202. Alternatively, in other examples, encoder 204 can be configured to sense a change in rotational position (e.g., a change in rotational angle) of crown 208 over some sampling period and to output an analog or digital representation of the sensed change to processor 202. In these examples, the crown position information can further indicate a direction of rotation of the crown 208 (e.g., a positive value can correspond to one direction and a negative value can correspond to the other). In yet other examples, encoder 204 can be configured to detect a rotation of crown 208 in any desired manner (e.g., velocity, acceleration, or the like) and can provide the crown rotational information to processor 202. The rotational velocity can be expressed in numerous ways. For example, the rotational velocity can be expressed as a direction and a speed of rotation, such as hertz, as rotations per unit of time, as rotations per frame, as revolutions per unit of time, as revolutions per frame, as a change in angle per unit of time, and the like. In alternative examples, instead of providing information to processor 202, this information can be provided to other components of device 200, such as, for example, a state machine. While the examples described herein refer to the use of rotational position of crown 208 to control scrolling or scaling of a view, it should be appreciated that any other physical state of the crown can be used to control appropriate actions.

In some examples, the state of the display 206 (which can correspond to display 106 described above) can control physical attributes of crown 208. For example, if display 206 shows a cursor at the end of a scrollable list, crown 208 can have limited motion (e.g., cannot be rotated forward). In other words, the physical attributes of the crown 208 can be conformed to a state of a user interface that is displayed on display 206. The mechanisms for controlling the physical attributes of the crown are described in further detail below. In some examples, a temporal attribute of the physical state of crown 208 can be used as an input to device 200. For example, a fast change in physical state can be interpreted differently than a slow change in physical state. These temporal attributes can also be used as inputs to control physical attributes of the crown.

Processor 202 can be further coupled to receive input signals from buttons 210, 212, and 214 (which can correspond to buttons 110, 112, and 114, respectively), along with touch signals from touch-sensitive display 206. Processor 202 can be configured to interpret these input signals and output appropriate display signals to cause an image to be produced by touch-sensitive display 206. While a single processor 202 is shown, it should be appreciated that any number of processors or other computational devices can be used to perform the functions described above.

Figure 3:
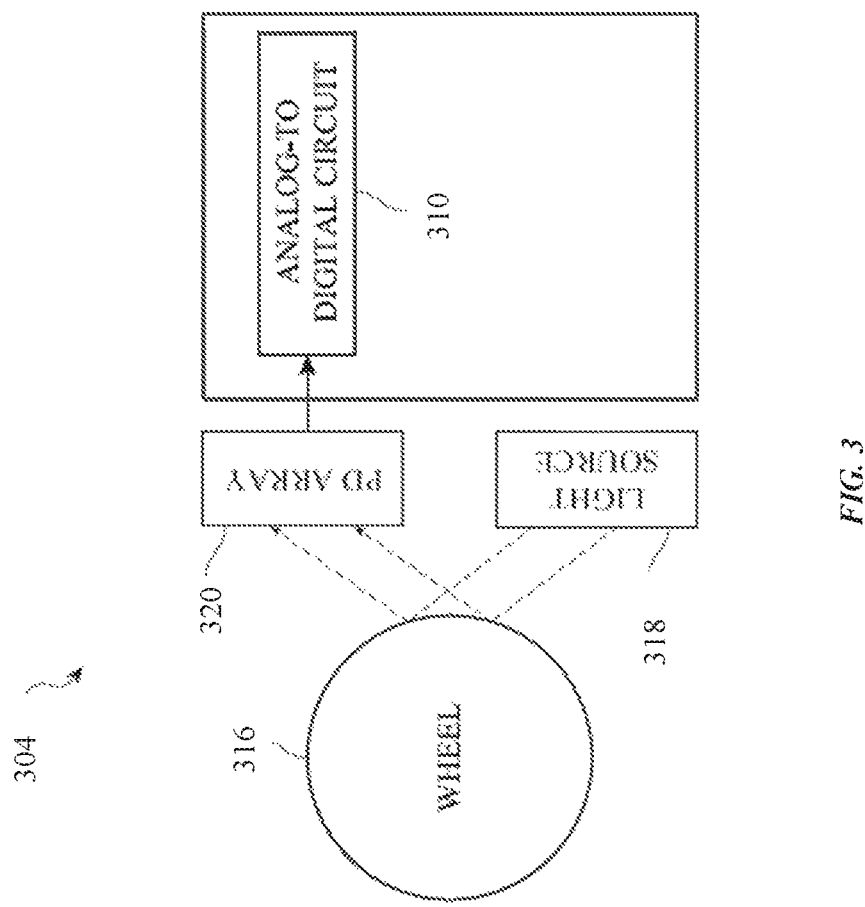
FIG. 3 illustrates a diagram of various components of an optical encoder that may be used to receive crown position information according examples of the disclosure.

FIG. 3 illustrates an exemplary block diagram of various components of an optical encoder 304 that can be used to receive crown position information according to examples of the disclosure. The optical encoder 304 shown in FIG. 3 may correspond to the encoder 204 described above, or may be used in conjunction with the encoder 204 described above. In various electronic devices, rotational and/or axial movement of a component (e.g., a crown) of the electronic device may need to be determined (e.g., the user interface scrolling operations described above for FIG. 2). In such instances, an optical encoder 304 may be used to detect the rotational movement and the axial movement of the component. For example, an optical encoder 304 according to examples of the disclosure can include a light source 318 that shines on a wheel 316 (also referred to as an encoder wheel) or a shaft of the optical encoder. The wheel 316 (or shaft) may include an encoding pattern, such as, for example, a collection of light and dark lines that are arranged in a particular sequence or in a particular pattern. In some examples, the wheel 316 may be integrated with or attached by a shaft to the crown 108 described above.

When light from the light source 318 hits the encoding pattern, the encoding pattern can modulate the light and reflect it onto one or more sensors 320 associated with the optical encoder. As will be described further in the present disclosure, creating the encoding pattern can be achieved using a variety of techniques including absorption, scattering, and redirection of light (e.g., using a surface topology of the wheel 316). In certain examples, the one or more sensors 320 may be an array of photodiodes (PD). As light from the light source 318 is reflected off the wheel 316, one or more photodiodes of the photodiode array 320 can produce a voltage measurement associated with an amount of light received at a given sample time. Once the light is received by the photodiode array 320 at a given time period, an analog-to-digital circuit 310 can convert the analog signal received from the photodiode array to a digital signal. The corresponding digital signals can be processed, and a determination may be made as to the direction, speed and/or movement (rotational and/or axial) of the wheel.

Figure 4A:
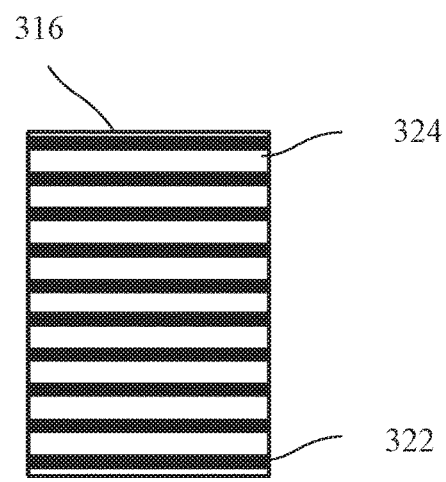
FIGS. 4A-4B illustrate an exemplary encoder wheel having a surface encoding pattern based on absorption and/or scattering of light according to examples of the disclosure
Figure 4B:
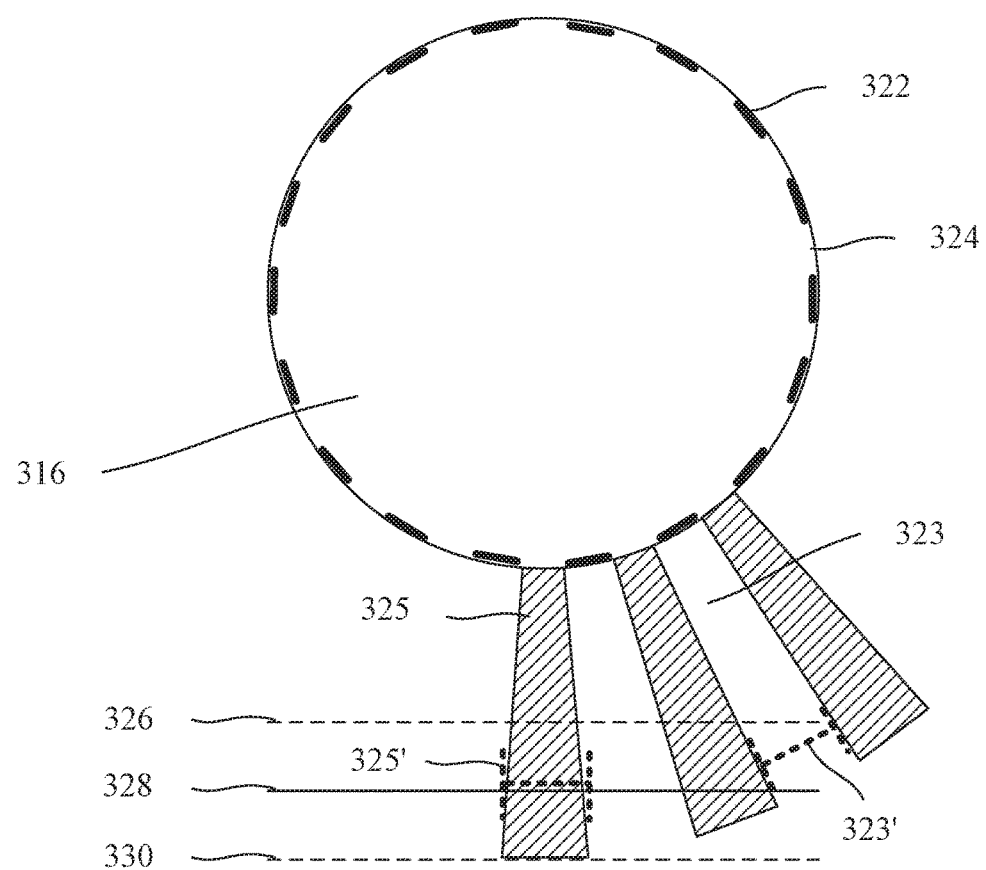

FIGS. 4A-4B illustrate an exemplary encoder wheel 316 (which can correspond to wheel 316 above) having a surface encoding pattern based on absorption and/or scattering according to examples of the disclosure. FIG. 4A illustrates a side view of encoder wheel 316. In some examples, an exterior surface (i.e., a circumferential surface) of the encoder wheel 316 can be shiny (i.e., exhibiting specular reflective properties). In some examples, an encoder wheel can be made from a polished metal (e.g., polished steel). In some examples, an exterior (e.g., circumferential) surface of the encoder wheel 316 can be coated with a reflective coating (e.g., a mirror coating such as chrome). In some examples, a pattern of dark stripes 322 and light stripes 324 can be formed by, for example, applying an ink layer to portions of an exterior (e.g., circumferential) surface of the encoder wheel 316 at a regular spacing. In some examples, the ink layer (e.g., at dark stripes 322) can absorb more light than the reflective portions which can cause dark stripes in the pattern of reflected light 323. In some examples, the reflective surface of the encoder wheel can reflect more light, which can cause bright stripes in the pattern of reflected light 325. In some examples, the dark stripes 322 can be created by laser etching the outer surface of the encoder wheel 316. In some examples, the laser etched portions of the outer surface of the encoder wheel 316 can be roughened such that light bouncing on the etched portions reflects in many directions (e.g., diffuse reflection, or scattering). Thus, in some examples, the laser etched portions (e.g., at darks stripes 322) can form the dark stripes in the pattern of reflected light 323 when surface roughness causes less of the light to reflect toward the direction of the photodiode array (e.g., 320 above). However, it should be noted that a portion of the light reflected from a dark stripe 322 can return to the photodiode array (e.g., 320 above), and thus the dark stripes in the pattern of reflected light 323 are not necessarily captured as completely dark measurements. It should also be understood that a portion of the light reflected in diffuse reflection and/or absorbed by the dark stripes 322 will never be detected by the photodiode array (e.g., 320 above) and thus a portion of the transmitted light can be considered wasted because it is transmitted but never received as a signal. In some examples, where the dark stripes 322 and light stripes 324 are of approximately equal width, only slightly more than 50% of the light will ever be detected by a photodetector (e.g., 320 above). Wasting energy can be particular detrimental in battery operated devices, where wasting energy can result in a reduction in operation time of the device. One objective of the examples of the disclosure is to propose alternative configurations of an encoder wheel that can provide improved energy efficiency, in addition to other benefits described below.

FIG. 4B illustrates an end view of encoder wheel 316. In some examples, dark stripes 322 and light stripes 324 (e.g., reflective stripes) can be disposed around an outer surface of the encoder wheel. In FIG. 4B, the stripes are illustrated as visible from the end view of the encoder wheel, however depending on how the light stripes 324 and dark stripes 322 are formed, the encoding pattern may not necessarily be visible from the angle depicted. In some examples, solid line 328 can represent a nominal distance between the encoder wheel 316 and a light source (e.g., 318 above) and/or a nominal distance between the encoder wheel and a photodiode array (e.g., 320 above). In some examples, light sections 325 and dark sections 323 can represent a pattern of light reflected from the encoder wheel that will be visible at the photodiode array (e.g., 320 above) as the encoder wheel 316 is rotated. While light sections 325 are illustrated with a pattern, it should be understood that the sections are meant to represent areas of high reflection that can cause brighter light at a photodiode array (e.g., 320 above). In some examples, light stripes 325 can have a light stripe width 325' at the nominal distance and dark stripes 323 can have a dark stripe width 323' at the nominal distance. As can be seen in the illustration, because the encoder wheel 316 can have a cylindrical shape, the curvature of the outer surface can behave as a convex mirror at locations of light stripes 324 (e.g., each light stripe can be viewed as a curved reflective surface or mirror). In some examples, the convex mirror shape of the wheel 316 can result in a diverging light beam of the reflected light. Thus, the width of the light stripe 325' at for reduced distance 326 (e.g., closer to the encoder wheel) can be narrower than the light strip at increased distance 330 (e.g., farther from the encoder wheel). It should be understood that in some examples, the encoder wheel 316 can actually become tilted relative to the nominal spacing between the encoder wheel (e.g., nominal distance 328), the photodiode array (e.g., 320 above) and the light source (e.g., 318 above). In some examples, tilting of the encoder wheel 316 can cause the distance light travels after reflecting from the encoder wheel to increase (e.g., corresponding to increased distance 330) or to decrease (e.g., corresponding to reduced distance 326). As explained above, the encoder wheel 316 can be attached (e.g., by a shaft) to a rotatable input that can act as an input to an electronic device. Thus, it should be understood that the photodiode array (e.g., 320 above) may detect light stripes 325 and dark stripes 323 of differing widths depending on a distance between the encoder wheel 316 and the photodetector (e.g., 320 above) and light source (e.g., 318 above). This effect can result in different measurements of relative or absolute position, rotation, speed, etc. of the encoder wheel 316. In some cases the change in the pattern of dark stripes 323 and light stripes 325 can be compensated for by signal processing of the raw detected signals. Examples of the disclosure below illustrate exemplary alternative configurations for forming light stripes 325 and dark stripes 323 in the light reflected from the encoder wheel 316.

Figure 5A:
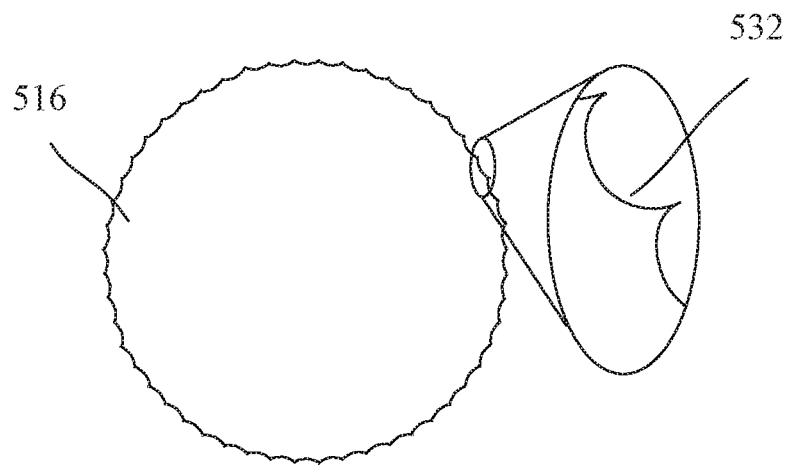
FIGS. 5A-5B illustrate a first exemplary alternative configuration of the encoder wheel utilizing surface features of the encoder wheel to create an encoding pattern according to examples of the disclosure.
Figure 5B:
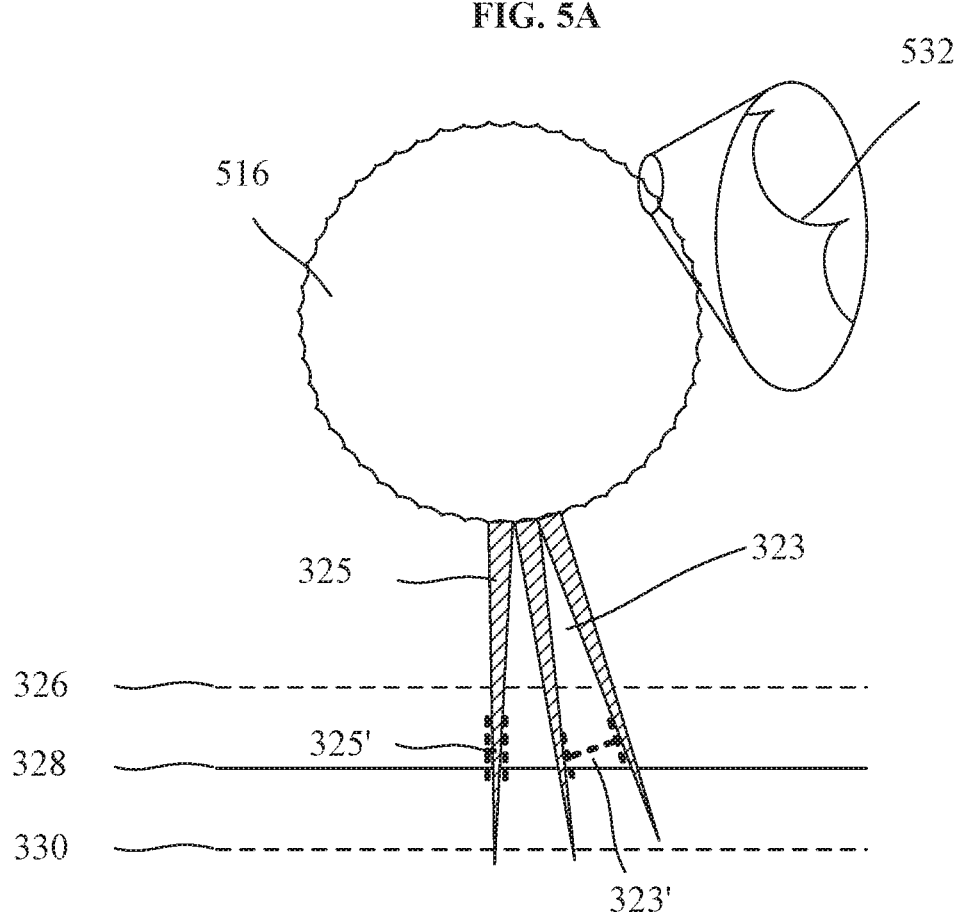

FIGS. 5A-5B illustrate a first exemplary alternative configuration of the encoder wheel 516 (which can correspond to encoder wheel 316 above) utilizing surface features of the encoder wheel to create an encoding pattern in reflected light according to examples of the disclosure. FIG. 5A illustrates an end view of the encoder wheel 516 in which the light and dark stripes can be created by concave mirrors 532 formed around an exterior surface of the encoder wheel. The encoder wheel 516, including its surface features, can be formed from plastics, resins (e.g., by injection molding) or metal (e.g., by casting or sintering). It should be understood that other materials and manufacturing techniques capable of making a wheel with surface features consistent with the teachings of examples of the disclosure can also be suitable. In some examples, an exterior surface of the material used to manufacture encoder wheel 516 can be reflective (e.g., polished steel), as described above. In some examples, the exterior surface of the encoder wheel 516 can be coated with a reflective coating (e.g., chrome), as described above. A magnified view of a concave mirror section 532 of the encoder wheel 516 is illustrated to better show the surface feature of the exemplary encoder wheel according to the example.

FIG. 5B illustrates a patterns of reflected light that can be generated by the concave mirrors 532 on an exterior (e.g., circumferential) surface of the encoder wheel 516. In some examples, the width of light stripes 325' at the nominal distance 328 can be different from a width of dark stripes 323' (e.g., as shown, light stripes can be narrower than dark stripes). In some examples, the spacing and power of the concave mirrors can be designed such that the width of dark stripes 323' and the width of the light stripes 325' can be the same at the nominal distance 328. The light reflecting from concave mirrors 532 can converge, which can direct nearly all of the light away from the areas of dark stripes 323 into the areas of the light stripes 325, thus causing all or nearly all of the transmitted light to reach the photodetector array (e.g., 320 above). It should be understood that generation of dark stripes 323 and light stripes 325 in the reflected light as illustrated configuration can result from the form (e.g., inclusion of concave mirrors 532) on a surface of the encoder wheel 516. In some examples, the entire surface of the encoder wheel 516 can be uniformly reflective, exhibiting specular reflective properties, and due to the light steering can still generate light and dark stripes in the reflected light. By contrast, as described above, the encoder wheel 316 of FIG. 4 can rely on absorption and/or scattering (i.e., diffusing) of light to create dark stripes, effectively throwing away the energy used to generate the light at the light source. In some examples, at increased distance 330, the reflected light can further converge such that the light stripe width 325' will be relatively narrower and the dark stripe width 323' will be relatively wider. Thus, the photodiode array (e.g., 320 above) can detect different widths of light and dark stripes depending on a distance of the encoder wheel from the photodiode array (e.g., 320 above) and light source (e.g., 318 above). This variation in stripe width can potentially create problems for an algorithm used to detect motion based on the light stripes 325 and dark stripes 323, as described above. The illustrations of FIGS. 5A-5B show only one example of surface features that can be used to generate dark and light stripes in reflected light.

Additional configurations with different surface feature structures can be illustrated below and can have similar physical properties to the example illustrated in FIGS. 5A-5B. The examples below can be manufactured using similar techniques (e.g., injection molding, casting, etc.) to the ones described above. In addition, the examples below can have a uniformly reflective surface, rather than relying on variations in reflective properties (e.g., absorption, diffuse reflection) of the surface to create the encoding pattern.

Figure 6A:
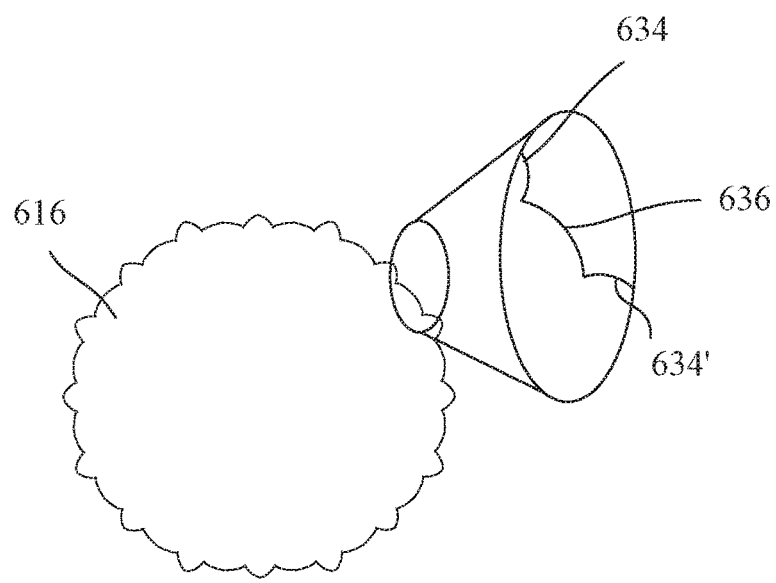
FIGS. 6A-6B illustrate a second exemplary alternative configuration of the encoder wheel utilizing surface features of the encoder wheel to create an encoding pattern according to examples of the disclosure.
Figure 6B:
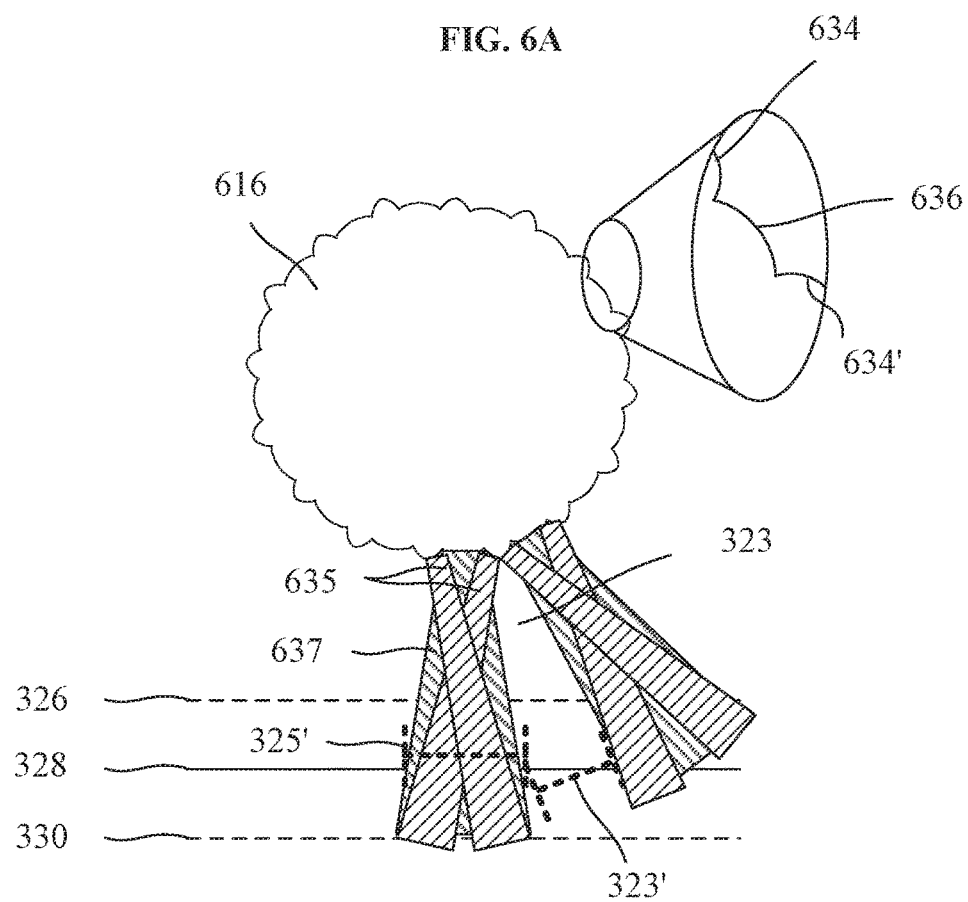

FIGS. 6A-6B illustrate a second exemplary alternative configuration of the encoder wheel 616 (which can correspond to encoder wheel 316 above) utilizing surface features to create an encoding pattern according to examples of the disclosure. FIG. 6A illustrates an end view of the encoder wheel 616 in which the light stripes and dark stripes 323 can be created by convex mirrors 634, 634' and 636 formed on the surface of the encoder wheel. A portion of the surface pattern is expanded to more distinctly show a convex primary mirror portion 636 as well as convex secondary mirror portions 634 and 634' that can be repeated around an exterior (e.g., circumferential) surface of the encoder wheel 316.

FIG. 6B illustrates patterns of reflected light (e.g., reflected light from light source 318 above) from the primary convex mirror portion 636 and secondary convex mirror portions 634 and 634'. As shown, primary light 637 reflected from the primary mirror portion 636 can overlap with secondary light 635 reflected from the secondary mirror portions 634 and 634'. At the same time, secondary mirror portions 634 and 634' on either side of the dark stripes 323 effectively direct light away from the region of the dark stripes. As with the configuration of FIGS. 5A-5B above, the dark stripes and light stripes can be created by steering of the light using surface features of the encoder wheel 316, rather than relying on absorption and/or scattering (i.e., diffusing) of the light to create dark stripes 323. Since the light 635 from secondary sections 634 and 634' is redirected into the light stripes rather than being absorbed or scattered away, the light stripes can be brighter (relative to, for example, the stripes FIGS. 4A-4B), and a contrast between the light and dark stripes can be improved. Furthermore, as illustrated, redirected light 635 from the secondary mirror portions 634 and 634' can be directed within the width of the light stripe 325' at the nominal distance 328, as well as at the reduced distance 326 and at the increased distance 330. Thus, in some examples, a width of the light stripes 325' and a width of the dark stripes 323' can be fairly uniform over deviations of the distance between the encoder wheel 316 and the photodiode array (e.g., 320 above). In other words, the arrangement of primary mirror portion 636 and secondary mirror portions 634 and 634' can provide an optical system with an increased depth of field of relative to the implementation illustrated in FIGS. 5A-5B above.

Figure 7A:
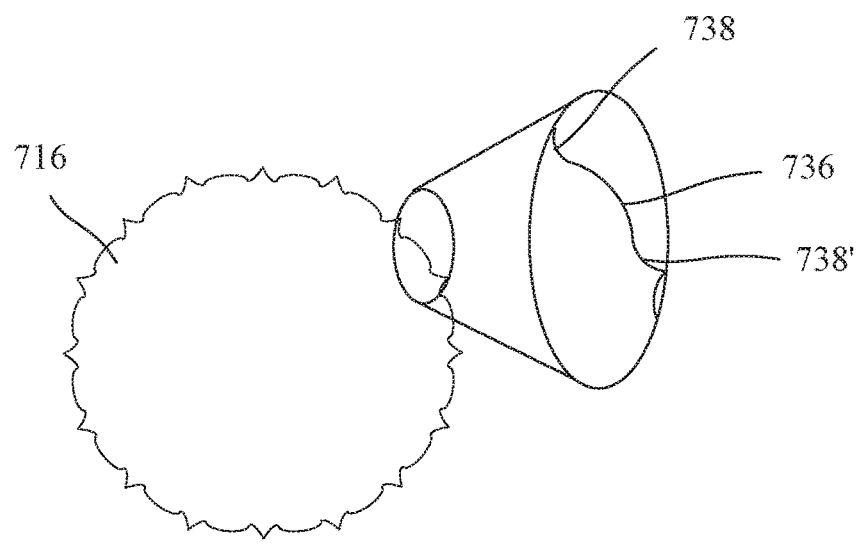
FIGS. 7A-7B illustrate a third exemplary alternative configuration of the encoder wheel utilizing surface features of the encoder wheel to create an encoding pattern according to examples of the disclosure.
Figure 7B:
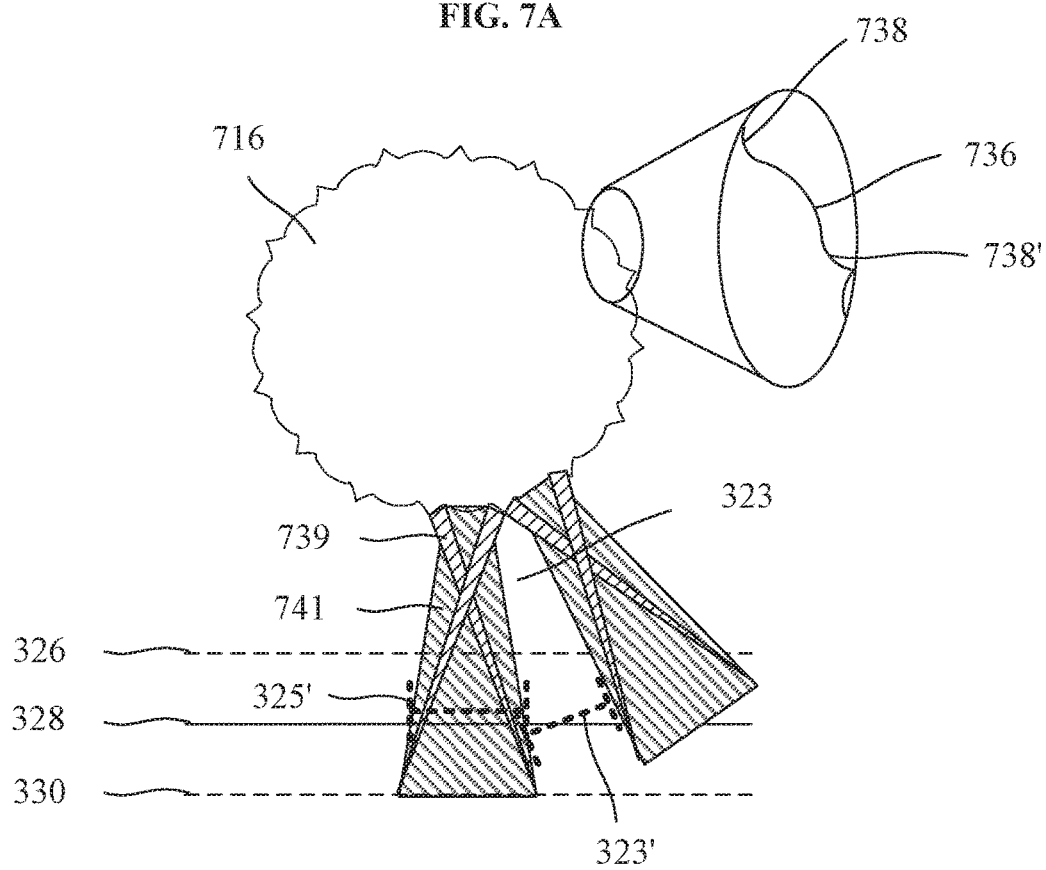

FIGS. 7A-7B illustrate a third exemplary alternative configuration of the encoder wheel 716 (which can correspond to encoder wheel 316 above) utilizing surface features to create an encoding pattern according to examples of the disclosure. FIG. 7A illustrates an end view of the encoder wheel 716 in which the light and dark stripes in the pattern of reflected light can be created by a combination of convex and concave mirrors formed on the surface of the encoder wheel. A portion of the surface pattern is expanded to more distinctly show a primary convex mirror portion 736 as well as secondary concave mirror portions 738 and 738' that can be repeated around a circumferential surface of the encoder wheel 316.

FIG. 7B illustrates patterns of reflected light (e.g., reflected light from light source 318 above) from the convex primary mirror portion 736 and concave secondary mirror portions 738 and 738'. As shown, light 741 reflected from the primary mirror portion 736 can overlap with light 739 reflected from the secondary mirror portions 738 and 738'. At the same time, secondary mirror portions 738 and 738' on either side of the dark stripes 323 effectively direct light away from the region of the dark stripes 323. As with the configuration of FIGS. 5A-5B, the dark and light stripes can be created by steering of the light using surface features of the encoder wheel 316, rather than relying on absorption and/or scattering (i.e., diffusing) of the light to create dark stripes 323. Since the light 739 from secondary sections 738 and 738' is redirected into the light stripes rather than being absorbed or scattered away, the light stripes can be brighter, and a contrast between the light and dark stripes can be improved. Furthermore, as illustrated, redirected light 739 from the secondary mirror portions 738 and 738' can be directed within the width of the light stripe 325' at the nominal distance 328, as well as at the reduced distance 326 and at the increased distance 330. Thus, in some examples, the width of the light stripes 325' and the width of the dark stripes 323' can be more uniform over deviations of the distance between the encoder wheel 716 and the photodiode array (e.g., 320 above). In other words, the arrangement of primary mirror portion 736 and secondary mirror portions 738 and 738' can provide an optical system with an increased depth of field of relative to the implementation illustrated in FIGS. 5A-5B above.

As can be understood from the various examples of the disclosure, a surface topology for an encoder wheel 316 can be used to generate an encoding pattern of light and dark stripes in light reflected from the surface of the encoder wheel, even when the surface of the encoder wheel is uniformly reflective. The size and number of surface features in the illustrates of FIGS. 4-7 are exemplary and are not necessarily to scale. Increased resolution can be In some examples, the surface pattern can be comprised of convex mirror portions, concave mirror portions, or combinations thereof. In some examples, the surface pattern can be comprised of flat mirror portions (not illustrated) that can have angles for redirecting portions of the incident light in different directions to form the dark stripes (and divert the light to the light stripes. For example, in FIGS. 6A-6B and 7A-7B, primary mirror portions 636 and 736 could be flat rather than being convex, without departing from the scope of the disclosure. Similarly, in some examples, secondary mirror portions 634 and 634' or 738 and 738' could be flat, instead of being convex or concave as illustrated in the examples above. Any of the above examples or variations therefore can be used to generate reflected light and dark stripes from a surface that is uniformly reflective, rather than relying on absorption and/or scattering (i.e., diffusing) of incident light to create dark stripes in the reflected light. It should be understood that the surface pattern can extend across a length of the encoder wheels (e.g., 316, 516, 616, and 716) to form a plurality of channels in the outer surface of the encoder wheel. In some examples, the channels can be mutually parallel to each other.

Therefore, according to the above, some examples of the disclosure are directed to an apparatus comprising: a rotatable optical encoder having a first surface, where the first surface comprises a specularly reflective material, and a surface shape of the first surface is configured to generate a modulated pattern of brightness in light specularly reflected by the first surface. Additionally or alternatively to one or more of the examples disclosed above, in some examples, the surface shape of the first surface includes angled reflective portions configured to reflect light toward bright portions of the modulated pattern and away from dark portions of the modulated pattern. Additionally or alternatively to one or more of the examples disclosed above, in some examples, the rotatable optical encoder is reflective across a continuously reflective portion of the first surface, the continuously reflective portion of the first surface including the angled reflective portions. Additionally or alternatively to one or more of the examples disclosed above, in some examples, the surface shape comprises a plurality of convex mirror sections. Additionally or alternatively to one or more of the examples disclosed above, in some examples, the surface shape comprises a plurality of concave mirror sections. Additionally or alternatively to one or more of the examples disclosed above, in some examples, the surface shape of the first surface comprises a plurality of channels on the first surface of the encoder. Additionally or alternatively to one or more of the examples disclosed above, in some examples, the channels are along the length of the rotatable optical encoder and are mutually parallel. Additionally or alternatively to one or more of the examples disclosed above, in some examples, each convex mirror section is associated with a channel along a length of the encoder. Additionally or alternatively to one or more of the examples disclosed above, in some examples, two or more angled reflective portions form a channel on the first surface of the encoder. Additionally or alternatively to one or more of the examples disclosed above, in some examples, a first, second, and third angled reflective portion form a channel on the first surface of the encoder, each of the first, second, and third angled reflective portions facing a different direction. Additionally or alternatively to one or more of the examples disclosed above, in some examples, a position on the first surface at the second reflective portion is perpendicular to a radial axis projected between the first surface and a center of the rotatable optical encoder and the second reflective portion is between the first reflective portion and the third reflective portion. Additionally or alternatively to one or more of the examples disclosed above, in some examples, the modulation pattern is a pattern of alternating bright and dark stripes.

Some examples of the disclosure are directed to an apparatus comprising a light source, a light sensor, and a rotatable optical encoder configured to reflect light from the light source onto the light sensor, the rotatable optical encoder having a first circumferential surface having a first surface topology, the first surface topology comprising a first plurality of reflective sections and a second plurality of reflective sections configured to reflect light from the light source onto the sensor in a modulated brightness pattern indicative of rotational movement of the rotatable optical encoder, wherein the first plurality of reflective sections are configured to reflect light along a radial axis of the rotatable optical encoder and the second plurality of reflective sections are configured to reflect light along a second axis, different from the radial axis of the rotatable optical encoder. Additionally or alternatively to one or more of the examples disclosed above, in some examples, the first plurality of reflective sections and the second plurality of reflective sections comprise convex mirrors. Additionally or alternatively to one or more of the examples disclosed above, in some examples, the first plurality of reflection sections comprise convex mirrors and the second plurality of reflective sections comprise concave mirrors. Additionally or alternatively to one or more of the examples disclosed above, in some examples, at least one of the first plurality of reflective sections and the second plurality of reflective sections is a flat mirror. Additionally or alternatively to one or more of the examples disclosed above, in some examples, the first surface topology comprises a plurality of channels formed by the first plurality reflective sections and the second plurality of reflective sections. Additionally or alternatively to one or more of the examples disclosed above, in some examples, the plurality of channels are along the length of the rotatable optical encoder and are mutually parallel. Additionally or alternatively to one or more of the examples disclosed above, in some examples, rotation of the rotatable optical encoder results in a pattern of light and dark stripes onto the light sensor, and wherein a specularly reflective portion of the rotatable optical encoder is positioned directly opposite the light sensor when a dark stripe is detected by the light sensor. Additionally or alternatively to one or more of the examples disclosed above, in some examples, one of the second plurality of reflective sections is positioned directly opposite the light sensor when a dark stripe is detected by the light sensor. Additionally or alternatively to one or more of the examples disclosed above, in some examples, the first circumferential surface of the rotatable optical has a specularly reflective characteristic. Additionally or alternatively to one or more of the examples disclosed above, in some examples, the rotatable optical encoder is operatively coupled to a mechanical input mechanism of a wearable electronic device.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:
1. An apparatus comprising:
   an light source configured to transmit light toward a rotatable optical encoder;
   the rotatable optical encoder having a first surface, where the first surface comprises a specularly reflective material, and a surface shape of the first surface is configured to generate a modulated pattern of brightness in light from the light source specularly reflected by the first surface, the first surface comprising:
   a first plurality of primary convex mirror sections configured to reflect incident light toward bright portions of the modulated pattern of brightness and away from dark portions of the modulated pattern of brightness; and a second plurality of secondary mirror sections having a second surface shape different from the plurality of convex mirror sections wherein light reflected from the secondary mirror sections overlaps with light reflected from the primary convex mirror sections.

2. The apparatus of claim 1, wherein the surface shape of the first surface includes angled reflective portions configured to reflect light toward bright portions of the modulated pattern and away from dark portions of the modulated pattern.

3. The apparatus of claim 2, wherein the rotatable optical encoder is reflective across a continuously reflective portion of the first surface, the continuously reflective portion of the first surface including the angled reflective portions.

4. The apparatus of claim 1, wherein the second surface shape comprises a plurality of convex mirror sections.

5. The apparatus of claim 1, wherein the second surface shape comprises a plurality of concave mirror sections.

6. The apparatus of claim 1, wherein the surface shape of the first surface comprises a plurality of channels on the first surface of the encoder, each channel comprising at least one primary mirror section and at least one secondary mirror section.

7. The apparatus of claim 6, wherein the channels are along a length of the rotatable optical encoder and are mutually parallel.

8. The apparatus of claim 4, wherein each convex secondary mirror section is associated with a channel along a length of the encoder.

9. The apparatus of claim 2, wherein two or more reflective portions form a channel on the first surface of the encoder.

10. The apparatus of claim 2, wherein a first, second, and third reflective portion form a channel on the first surface of the encoder, each of the first, second, and third reflective portions facing a different direction.

11. The apparatus of claim 10, wherein:
a position on the first surface at the second reflective portion is perpendicular to a radial axis projected between the first surface and a center of the rotatable optical encoder; and
the second reflective portion is between the first reflective portion and the third reflective portion.

12. The apparatus of claim 1, wherein the modulation pattern is a pattern of alternating bright and dark stripes.

13. An apparatus comprising:
a light source;
a light sensor; and
a rotatable optical encoder configured to reflect light from the light source onto the light sensor, the rotatable optical encoder having a first circumferential surface having a first surface topology, the first surface topology comprising a first plurality of reflective sections and a second plurality of reflective sections configured to reflect light from the light source onto the sensor in a modulated brightness pattern indicative of rotational movement of the rotatable optical encoder, wherein the first plurality of reflective sections are configured to reflect light along a radial axis of the rotatable optical encoder and the second plurality of reflective sections are configured to reflect light along a second axis, different from the radial axis of the rotatable optical encoder such that the light reflected by the second plurality of reflective sections overlaps with the light reflected by the first plurality of reflective sections in a bright portion of the modulated brightness pattern.

14. The apparatus of claim 13, wherein the first plurality of reflective sections and the second plurality of reflective sections comprise convex mirrors.

15. The apparatus of claim 13, wherein the first plurality of reflection sections comprise convex mirrors and the second plurality of reflective sections comprise concave mirrors.

16. The apparatus of claim 13, wherein at least one of the first plurality of reflective sections and the second plurality of reflective sections is a flat mirror.

17. The apparatus of claim 13, wherein the first surface topology comprises a plurality of channels formed by the first plurality reflective sections and the second plurality of reflective sections.

18. The apparatus of claim 17, wherein the plurality of channels are along the length of the rotatable optical encoder and are mutually parallel.

19. The apparatus of claim 13, wherein rotation of the rotatable optical encoder results in a pattern of light and dark stripes onto the light sensor, and wherein a specularly reflective portion of the rotatable optical encoder is positioned directly opposite the light sensor when a dark stripe is detected by the light sensor.

20. The apparatus of claim 19, wherein one of the second plurality of reflective sections is positioned directly opposite the light sensor when a dark stripe is detected by the light sensor.

21. The apparatus of claim 13, wherein the first circumferential surface of the rotatable optical has a specularly reflective characteristic.

22. The apparatus of claim 13, wherein the rotatable optical encoder is operatively coupled to a mechanical input mechanism of a wearable electronic device.

* * * * *